(12) United States Patent
Wakazono et al.

(10) Patent No.: US 9,494,494 B2
(45) Date of Patent: Nov. 15, 2016

(54) CALIBRATING APPARATUS OF TIRE TESTING MACHINE AND CALIBRATING METHOD OF TIRE TESTING MACHINE

(71) Applicant: Kobe Steel, Ltd., Hyogo (JP)

(72) Inventors: Takehiko Wakazono, Takasago (JP); Munenori Soejima, Takasago (JP); Takahiko Ishii, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 253 days.

(21) Appl. No.: 14/480,957

(22) Filed: Sep. 9, 2014

(65) Prior Publication Data
US 2015/0122004 A1  May 7, 2015

(30) Foreign Application Priority Data
Nov. 7, 2013  (JP) .................................. 2013-231219

(51) Int. Cl.
*G01M 17/02* (2006.01)

(52) U.S. Cl.
CPC ........... *G01M 17/022* (2013.01); *G01M 17/02* (2013.01)

(58) Field of Classification Search
CPC ............. G01M 17/02; G01M 17/021; G01M 17/022; G01M 17/024
USPC ................................ 73/1.08, 1.09, 1.11, 1.15
See application file for complete search history.

(56) References Cited

U.S. PATENT DOCUMENTS 5,309,377 A * 5/1994 Beebe ................. G01M 17/022
                                                            702/105
2012/0297858 A1  11/2012 Sumimoto et al.

FOREIGN PATENT DOCUMENTS

| JP | 63070137 A | * | 3/1988 |
| JP | 01061643 A | * | 3/1989 |
| JP | 2012-158295 A |  | 8/2012 |
| JP | 2012-167962 A |  | 9/2012 |

OTHER PUBLICATIONS

Machine translation of JP 63070137.*
Machine translation of JP 01061643.*

* cited by examiner

*Primary Examiner* — Peter Macchiarolo
*Assistant Examiner* — Nathaniel Kolb
(74) *Attorney, Agent, or Firm* — Studebaker & Brackett PC (57) ABSTRACT

A calibrating apparatus of a tire testing machine of the present invention calibrates force components along a lateral direction of a load cell on a tire testing machine provided with a rotary drum and the load cell mounted to a shaft portion of the rotary drum and capable of measuring force applied to the rotary drum, and has a hook member hooked on an outer peripheral edge of the rotary drum, a linear body, one end side of which is connected to the hook member, a load applying member connected to the other end side of the linear body and capable of generating a reference load toward a downward direction, and a pulley device around which the linear body is wound to convert the downward force by the load applying member into an upward force on one end side of the linear body.

7 Claims, 7 Drawing Sheets

CALIBRATING APPARATUS OF TIRE TESTING MACHINE AND CALIBRATING METHOD OF TIRE TESTING MACHINE

BACKGROUND OF THE INVENTION

1. Field of the Invention

The present invention relates to a calibrating apparatus of a tire testing machine and a calibrating method of the tire testing machine.

2. Description of the Related Art

The tire testing machine for measuring uniformity or the like of a tire is usually provided with a load measuring means, such as a load cell. In the case of a rotary drum having shaft portions in a vertical direction, the load cell is disposed at each of the upper and lower shaft portions one by one. These load cells have a configuration capable of measuring both the vertical load and the horizontal load applied to the rotary drum.

Since the load cells have the configuration capable of measuring both the horizontal load and the vertical load, when calibrating the load cells of the tire testing machine, it is necessary to evaluate whether the measurement results corresponding to a reference load are measured by the load cells, by applying the reference load to the rotary drum in the horizontal direction (a radial direction) and the vertical direction (a lateral direction).

For example, JP 2012-167962 A discloses calibrating the load cells, by attaching a weight having the reference load to the rotary drum via a wire or the like, and by applying the reference load to the rotary drum in the horizontal direction (radial direction) via the wire, when calibrating the load cells.

SUMMARY OF THE INVENTION

The above-described related art discloses " . . . calibration in the vertical direction of the latter can be performed by directly placing the weight as a reference load on the drum" as well as applying the reference load to the rotary drum in the horizontal direction, but does not disclose a specific aspect thereof.

In addition, in the actual tire test, power in the lateral direction is generated in an upward direction as well as in a downward direction. For that reason, in order to accurately calibrate the load cell, it is necessary to perform the calibration by actually applying the upward force to the rotary drum, but in this respect, the above-described related art does not disclose the specific aspect thereof.

If the calibration is performed using the output values of the load cells obtained in the calibration which applies the load in the downward direction in place of the calibration of the upward force, since the upward force is not actually applied to the load cells in such a calibration, there is a possibility that the output value is not correct, which lacks the accuracy of the calibration.

For example, even if the calibrating method disclosed in JP 2012-167962 A or a calibrating method conceivable from the matters disclosed in JP 2012-167962 A is applied to the load cells that are normal when measuring the downward force, but are abnormal when measuring the upward force, it is not possible to confirm the abnormality as long as the calibration is performed by applying the downward load, and it is not possible to perform the accurate calibration.

The present invention has been made in view of the above-described problems, and an object thereof is to provide a calibrating apparatus and a calibrating method of the tire testing machine capable of accurately performing the calibration of the rotary drum in the lateral direction, by actually applying the upward force to the rotary drum, when performing the calibration of the rotary drum in the lateral direction.

In order to solve the above-described problems, the calibrating apparatus of the tire testing machine of the present invention has the following technical means.

That is, according to the present invention, there is provided a calibrating apparatus that performs calibration of force components along a lateral direction of the load cell on a tire testing machine provided with a cylindrical rotary drum that is rotatably mounted around a shaft portion oriented in a vertical direction, and a load cell that is mounted to the shaft portion of the rotary drum and capable of measuring force applied to the rotary drum, wherein the calibrating apparatus has a hook member that is hooked on an outer peripheral edge of the rotary drum; a linear body, one end side of which is connected to the hook member; a load applying member that is connected to the other end side of the linear body and capable of generating a reference load for calibrating the load cell toward a downward direction; and a pulley device around which the linear body is wound to convert the downward force applied to the other end side of the linear body by the load applying member into an upward force on the hook member side of the linear body.

Preferably, the load applying member may have a weight stacking unit mounted to a leading end of the linear body, and a plurality of weight members that can be stacked on the weight stacking unit.

Preferably, the weight members may be formed in a disc-shaped object, a part of the weight members may be recessed toward a center portion from an outer diameter portion, and the recessed portion may be formed as an insertion hole.

Preferably, handles may be mounted to the outer diameter portion of the weight member.

Preferably, a force measurer capable of measuring the upward force applied to the hook member may be disposed on the linear body between the hook member and the pulley device.

Preferably, a strip-shaped long body formed by a strip-shaped long plate member may be disposed between one end of the linear body extending from the hook member via the pulley device and the load applying member.

Further, according to the calibrating method of the tire testing machine of the present invention, when performing the calibration of the force components along the lateral direction of the load cell using the above-described calibrating apparatus of the tire testing machine, by performing a gradual increase process of adding one weight member stacked on the weight stacking unit to measure the upward force applied to the hook member by the load cell each time, and a gradual decrease process of decreasing one weight member stacked on the weight stacking unit to measure the upward force applied to the hook member by the load cell each time, the load cell is calibrated based on the plurality of measured values of the upward force obtained in the gradual increase process and the gradual decrease process.

According to the calibrating apparatus and the calibrating method of the tire testing machine of the present invention, when performing the calibration of the rotary drum in the lateral direction, by actually applying the upward force to the rotary drum, it is possible to accurately perform the calibration of the rotary drum in the lateral direction.

DESCRIPTION OF THE PREFERRED EMBODIMENTS

First Embodiment

Hereinafter, an embodiment of a calibrating apparatus 2 of a tire testing machine 1 and a calibrating method of the present invention will be described in detail with reference to the drawings.

Figure 1:
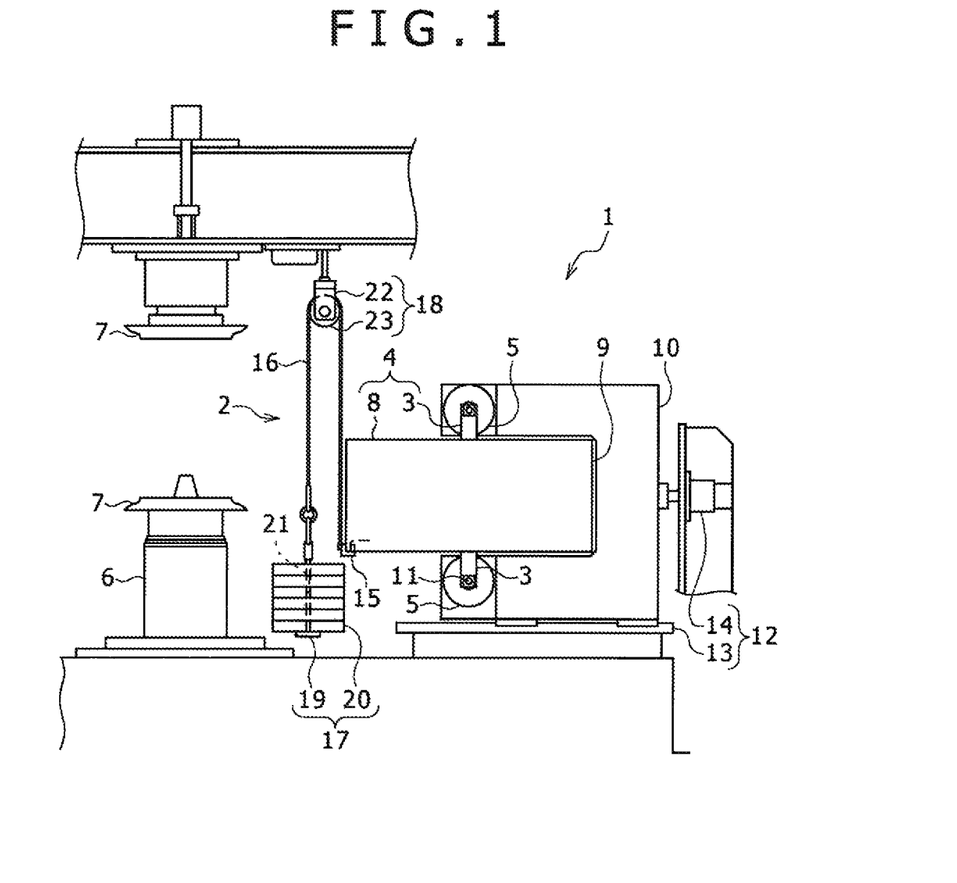
FIG. 1 is a diagram illustrating a calibrating apparatus of a tire testing machine of a first embodiment.

FIG. 1 schematically illustrates the calibrating apparatus 2 of the first embodiment.

As illustrated in FIG. 1, the calibrating apparatus 2 of the first embodiment is configured to perform the calibration of force components along the lateral direction of a load cell 5 on the tire testing machine 1 having a cylindrical rotary drum 4 that is rotatably mounted around a drum shaft 3 (shaft portion) oriented in the vertical direction, and a load cell 5 that is mounted to the drum shaft 3 of the rotary drum 4 and capable of measuring force acting on the rotary drum 4.

First, the tire testing machine 1 provided with the calibrating apparatus 2 of the first embodiment will be described below.

The tire testing machine 1 has a configuration in which the rotary drum 4 is horizontally moved and pressed against the tire fixed to a spindle 6 to measure force and moment generated in the rotary drum 4 when pressed against the tire.

Specifically, the spindle 6 provided in the tire testing machine 1 is a rod-shaped member that is disposed to direct the axis in the vertical direction, and is freely rotatable about an axis oriented in the vertical direction. Further, rims 7 configured to fix the tire so as to be interposed therebetween are provided in the spindle 6, and by rotating the spindle 6 while fixing the tire by the rims 7, it is possible to rotate the tire about the axis oriented in the vertical direction. The rims 7 are mounted to a vertically movable beam member, and when the beam member moves down, the rims 7 come into close contact with a projecting portion of the top of the spindle 6 facing the rims 7, and it is possible to fix the tire to be interposed therebetween.

Further, the rotary drum 4 has a cylindrical drum main body 8, and a drum shaft 3 penetrating the center of the drum main body 8 along the vertical direction. A bearing (not illustrated) is provided between the drum main body 8 and the drum shaft 3, and the rotary drum 4 is supported by the drum shaft 3 so as to be freely rotatable about the axis oriented in the vertical direction. On the outer peripheral surface of the rotary drum 4, a simulated road surface 9 is formed, and the tire that is a test target can come into contact with the simulated road surface 9. Further, the upper and lower ends of the drum shaft 3 are mounted to a support frame 10 having a center formed in a recessed shape when viewed from the front, via a load cell 5 to be described later using a fastening pin 11. Specifically, the upper end of the drum shaft 3 protrudes upward from the upper surface of the drum main body 8, and the upper load cell 5 is mounted to the protruding end of the drum shaft 3 protruding upward. Furthermore, the lower end of the drum shaft 3 protrudes downward from the lower surface of the drum main body 8, and the lower load cell 5 is mounted to the protruding end of the drum shaft 3 protruding downward.

The load cells 5 (force measurers) provided at upper and lower positions of the drum shaft 3 are capable of measuring force (radial direction force) that acts in a direction in which the rotary drum 4 comes close to or is away from the spindle 6, and force (lateral direction force) acting in the vertical direction.

The support frame 10 that supports the rotary drum 4 is provided with a slide mechanism 12 that moves the support frame 10 forward and backward with respect to the base in the horizontal direction. The slide mechanism 12 has a rail member 13 capable of guiding the support frame 10 along a horizontal direction, and a screw jack member 14 that is provided on the side of the support frame 10 to push and pull the support frame 10 in the horizontal direction, and when the support frame 10 pushed and pulled by the screw jack member 14 moves along a laying direction of the rail member 13, it is possible to press the outer peripheral surface (simulated road surface 9) of the rotary drum 4 against the tire mounted on the spindle 6, or pull the outer peripheral surface apart from the tire. In addition, as the rail member 13, for example, it is possible to adopt a linear motion guide or the like.

However, the calibrating apparatus 2 of the present invention is configured to calibrate the force components along the lateral direction of the load cell 5 on the above-described tire testing machine 1, and has a hook member 15 hooked on the outer peripheral edge of the rotary drum 4, a linear body 16, one end side of which is connected to the hook member 15, a load applying member 17 that is connected to the other end side of the linear body 16 and capable of generating the reference load for calibrating the load cell 5 toward the downward direction, and a pulley device 18 around which the linear body 16 is wound to convert the downward force applied to the other end side of the linear body 16 by the load applying member 17 into the upward force on one end side of the linear body 16.

Each of the hook member 15, the linear body 16, the load applying member 17, and the pulley device 18 forming the calibrating apparatus 2 of the present invention will be described.

As illustrated in FIG. 1, the hook member 15 is a member that is bent in a U-shape when viewed in the front view, and is hooked on the outer peripheral edge of the rotary drum 4. Specifically, the rotary drum 4 is formed of a cylindrical plate member or the like, the upper edge of the outer periphery of the cylindrical rotary drum 4 projects upward in the form of eaves, and the lower edge thereof projects downward in the form of eaves. Therefore, the above-described hook member 15 is hooked so that the bent portion is hooked on the lower edge of the outer periphery (outer peripheral surface). This enables the upward force generated by the load applying member 17 and transmitted via the pulley device 18 and the linear body 16 to be applied to the lower edge of the outer periphery (outer peripheral surface) of the rotary drum 4.

The linear body 16 is a string-shaped (linear) long member that does not break even by applying the maximum load generated by the load applying member 17, and a wire rope is used here. As the linear body 16, a rope, a sling or the like formed of metal, such as steel or stainless steel, and a synthetic fiber, such as nylon and aramid is used. The above-described hook member 15 is connected to one end side of the linear body 16, and the load applying member 17 is connected to the other end side of the linear body 16. A portion between one end side and the other end side of the linear body 16 is wound around the pulley device 18.

The load applying member 17 has a weight stacking unit 19 mounted to the leading end of the linear body 16, and a plurality of weight members 20 capable of being stacked on the weight stacking unit 19.

Specifically, the weight stacking unit 19 is a plate-like member disposed along the horizontal direction, and the upper surface of the weight stacking unit 19 is formed to be able to place the weight members 20 in a stacked form. Further, the other end side of the above-described linear body 16 is connected to the weight stacking unit 19 such that the weight of the weight member 20 stacked on the weight stacking unit 19 is applied to the linear body 16.

Figure 2:
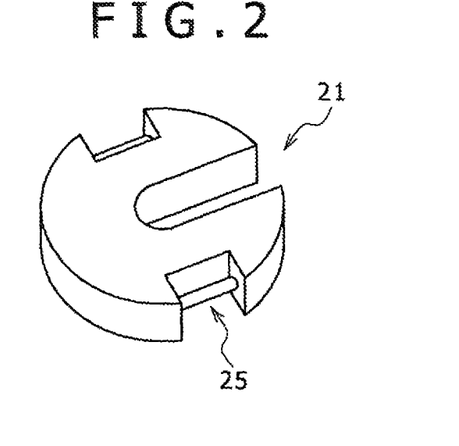
FIG. 2 is an enlarged view of a weight member.

Further, as illustrated in FIG. 2, the weight member 20 is formed in a substantially disc shape, for example, using metal such as steel, a insertion hole 21 through which the linear body 16 can be inserted is formed at the center thereof in a slit shape, that is, so that a part is recessed to the central portion from the outer diameter portion of the disc-shaped weight member 20. Further, two handles 25 are mounted to the outer diameter portion of the weight member 20 to interpose the insertion hole 21. Thus, the weight member 20 is configured to be easily stacked or detached by adding the weight stacking unit 19 in a suspended state. In addition, force generated per each weight member 20 is about 50 N to 100 N.

With such a configuration, when vertically stacking the plurality of weight members 20, in the load applying member 17, the plurality of weight members 20 are mounted on the upper portion of the weight stacking unit 19 so as not to fall out so that the insertion holes 21 provided at the center of the stacked weight members 20 are arranged in the vertical direction, and the linear body 16 passes through the insertion holes 21 arranged in the vertical direction.

Furthermore, the weight of the weight member 20 is set to the reference weight in advance, and by changing the number of the weight members 20 stacked on the weight stacking unit 19, it is possible to adjust the upward force applied to the hook member 15. If it is possible to adjust the downward force applied to the other end side of the linear body 16 in this way, it is also possible to change the upward force applied to the hook member 15 provided on one end side of the linear body 16, thereby performing the calibration of the load cell 5, while changing the applied load.

The pulley device 18 is a fixed pulley mounted at a position higher than the rotary drum 4, such as a ceiling and a beam of the production building, in a suspended shape, and is configured such that the position of the pulley does not move up and down.

Specifically, the pulley device 18 has a bracket 22, and a disc-shaped sheave 23 mounted to the bracket 22 so as to be rotatable about an axis oriented in the horizontal direction. The bracket 22 is mounted to the beam member provided with the rim 7. As mentioned above, the beam member is configured to be movable up and down as described above, but when practicing the method of calibrating the load cell 5 in the lateral direction, the beam member is fixed at the upper position.

A groove or the like, around which the linear body 16 can be wound, is formed on the outer peripheral surface of the sheave 23 along the circumferential direction. By providing the pulley device 18, it is possible to convert the downward force applied to the other end side of the linear body 16 by the load applying member 17 into the upward force on one end side of the linear body 16 (in other words, the hook member 15) and transmit the upward force to the rotary drum 4.

Next, the method of calibrating the load cell 5 in the lateral direction using the above-described calibrating apparatus 2, in other words, the method of calibrating the load cell 5 of the present invention will be described in detail.

First, before performing the calibration procedure of the load cell 5, a portion bent in a U-shape of the hook member 15 is hooked on the lower edge of the outer peripheral surface of the rotary drum 4 as preparation of the calibrating apparatus 2. One end side of the linear body 16 is connected to the hook member 15. Moreover, a halfway side in the longitudinal direction of the linear body 16 is wound around the sheave 23 of the pulley device 18, and the weight stacking unit 19 of the load applying member 17 is mounted to the other end side of the linear body 16.

When the preparation of the calibrating apparatus 2 is completed in this manner, a single weight member 20 is placed on the above-described weight stacking unit 19. Then, weight of the single weight member 20 stacked on the weight stacking unit 19 is applied to the other end side of the linear body 16 as a downward force, the direction of force is converted by the pulley device 18, and the upward force is applied to one end side of the linear body 16. In this way, the upward force measured by the load cell 5 is first measured when there is one weight member 20.

Next, the number of the weight member 20 stacked on the weight stacking unit 19 increases one by one to measure the upward force applied to the hook member 15 by the load cell 5 each time the number of weight member 20 increases by one. In this way, a gradual increase process of alternately repeating the addition of the weight member 20 and the measurement of force in the load cell 5 as described above is carried out continuously, until the maximum number of weight members 20 stacked on the weight stacking unit 19 is obtained.

After the maximum number of the weight members 20 stacked on the weight stacking unit 19 is obtained, the upward force is measured, while reducing the number of the weight member 20. That is, the number of the weight members 20 stacked on the weight stacking unit 19 decreases one by one to measure the upward force applied to the hook member 15 by the load cell 5 each time the number of weight member 20 decreases by one. In this way, the gradual decrease process of alternately repeating the decrease of the weight member 20 from the weight stacking unit 19, and the measurement of force is continuously carried out, until the number of the weight member 20 stacked on the weights stacking unit 19 becomes zero again.

Next, the load cell 5 is calibrated based on the plurality of measured values of upward force obtained in the above-described gradual increase process and gradual decrease process. That is, the values measured by the load cell 5 in the gradual increase process and the gradual decrease process are plotted with respect to the load applied to the load applying member 17 calculated from the number of the weight member 20, and the gain straight line of the load cell 5 nearest to the value of the reference load cell 5 is calculated by least squares method, thereby calibrating the load cell 5 to achieve the gain straight line.

The specific calibration procedure may be performed in the following order of (1) to (8).

(1) The calibrating apparatus 2 is mounted.
(2) One weight member 20 (reference weight) is placed. The output value of the load cell 5 is recorded.

(3) One weight member 20 is added. The output value of the load cell 5 is recorded.

(4) Similarly, the weight member 20 is added, and the value of the load cell 5 is recorded each time.

(5) The procedure of (4) is performed up to the maximum stacking amount (the maximum number) of the weight member 20. The above is the gradual increase process.

(6) The weight member 20 is next removed in order. The value of the load cell 5 is recorded each time.

(7) The procedure of (6) is repeated until there is no weight member 20. The above is the gradual decrease process.

(8) The calibration is performed by the output value of the load cell 5 with respect to the load due to the weight member 20 thus obtained.

If the above-described calibration procedure is performed, it is possible to determine the output value of the load cell 5 with respect to the reference weight load, that is, the gain straight line, and it is possible to calibrate the load cell 5.

In addition, the gain straight line is calculated by connecting the measured value when there is no load (in the case of minimum load) and the measured value when the weight member 20 is applied to the maximum stacking (in the case of maximum load), only the difference from the gain straight line is recorded between the maximum and minimum values, and it is possible to calibrate the load cell 5 using the recorded difference load and the gain straight line.

If the above-described calibrating apparatus 2 is used, since calibration of the load cell 5 is performed, while actually applying the upward force to rotary drum 4, it is possible to more accurately calibrate the load in the lateral direction. Further, in such a calibrating apparatus 2, when there is an abnormality in the load cell 5 when measuring the upward force, it is possible to immediately find the abnormality, thereby more reliably maintaining the accuracy of the load cell 5.

Second Embodiment

Next, the calibrating apparatus 2 of the tire testing machine 1 of the second embodiment will be described.

Figure 3:
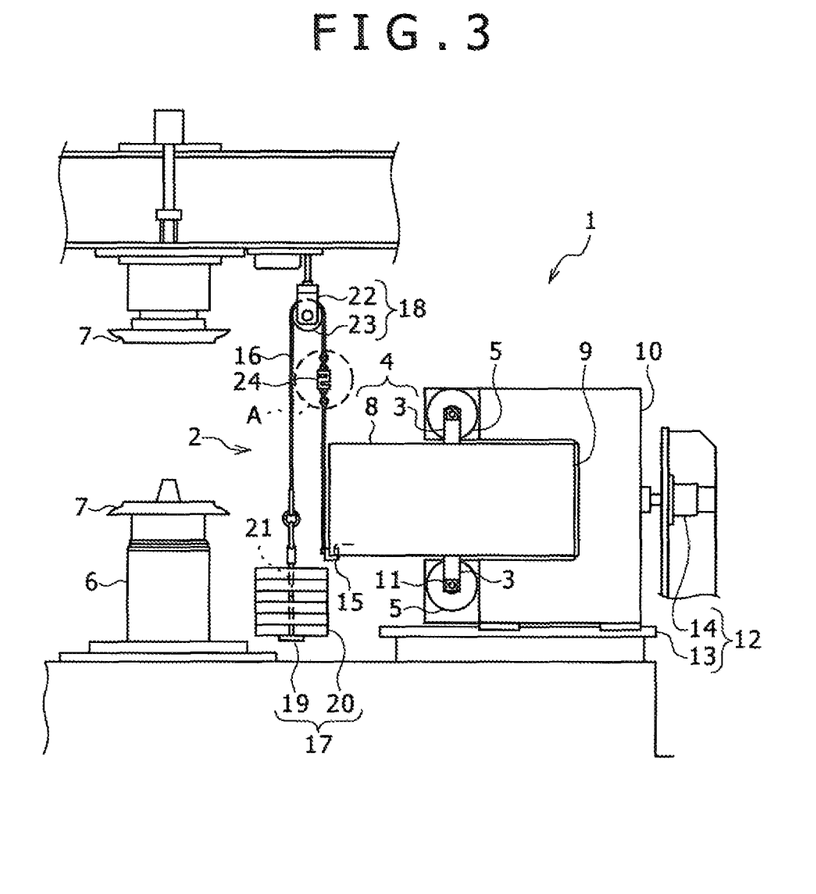
FIG. 3 is a diagram illustrating a calibrating apparatus of a tire testing machine of a second embodiment.

As illustrated in FIG. 3, in the calibrating apparatus 2 of the second embodiment, in the linear body 16 between the hook member 15 and the pulley device 18, a force measurer capable of measuring the upward force applied to the hook member 15 is disposed.

That is, the calibrating apparatus 2 of the second embodiment is provided with a second load cell 24 (force measurer) in the linear body 16 between the hook member 15 and the pulley device 18, apart from the load cell 5 to be calibrated, provided in the rotary drum 4. The second load cell 24 is able to exactly measure the upward force applied to the hook member 15, in other words, the upward force applied to the linear body 16.

The provision of the second load cell 24 is for the following reasons.

That is, between the sheave 23 of the pulley device 18 and the linear body 16, the frictional force is generated more or less, and even if the reference load is applied to the other end side of the linear body 16, only the load, from which the generated frictional force is subtracted, is applied to one end side interposing the pulley device 18. Therefore, there is a possibility that the measured value measured by the load cell 5 for calibration does not strictly correspond to the reference load. Of course, in many cases, since the above-described frictional force is very small, it is also possible to calibrate the load cell 5 without regard to the friction force, but in order to perform the more accurate calibration, it is preferred to directly measure the load applied to one end side of the linear body 16, that is, the hook member 15.

Figure 4:
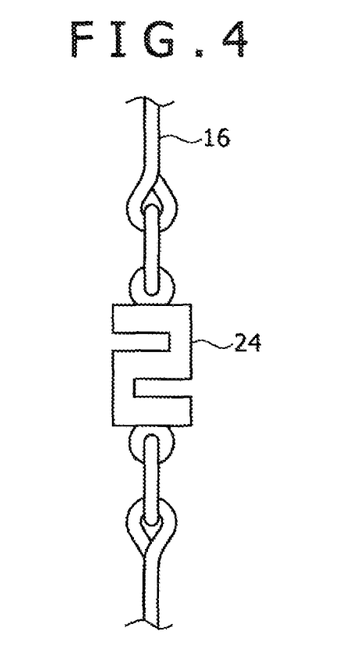
FIG. 4 is an enlarged view of a portion A of FIG. 3.

Therefore, as illustrated in FIG. 4, in the calibrating apparatus 2 of the second embodiment, by providing the second load cell 24 in the linear body 16 between the hook member 15 and the pulley device 18 to actually measure the upward force applied to the linear body 16, the calibration accuracy of the load cell 5 is further enhanced.

Specifically, when performing the gradual increase process and the gradual decrease process in the calibrating apparatus 2 of the second embodiment, if the load measured by the second load cell 24 is measured each time the weight member 20 is added or reduced and the gain straight line is calculated using the load measured by the second load cell 24 and the load measured by the load cell 5, more accurate calibration can be performed.

Third Embodiment

Next, a calibrating apparatus 2 of a tire testing machine 1 of a third embodiment will be described.

Figure 5:
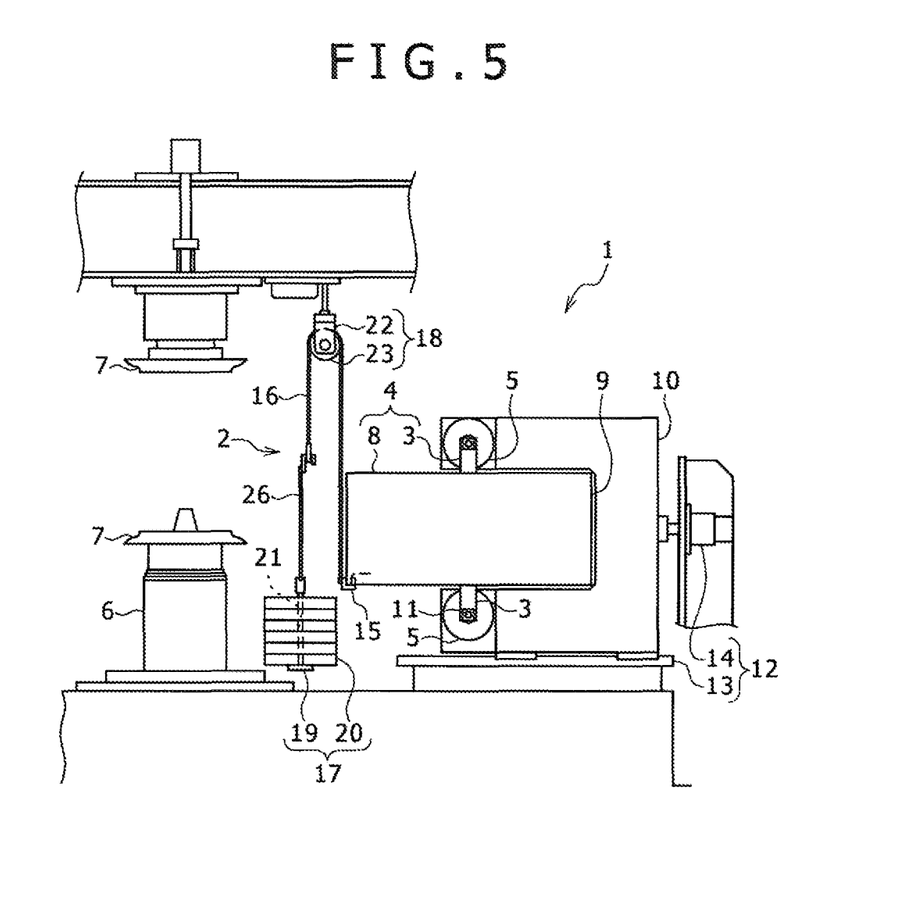
FIG. 5 is a diagram illustrating a calibrating apparatus of a tire testing machine of a third embodiment.

As illustrated in FIG. 5, in the calibrating apparatus 2 of the third embodiment, a strip-shaped long body 26 is disposed between one end of the linear body 16 extending from the hook member 15 via the pulley device 18 and the load applying member 17.

Figure 6:
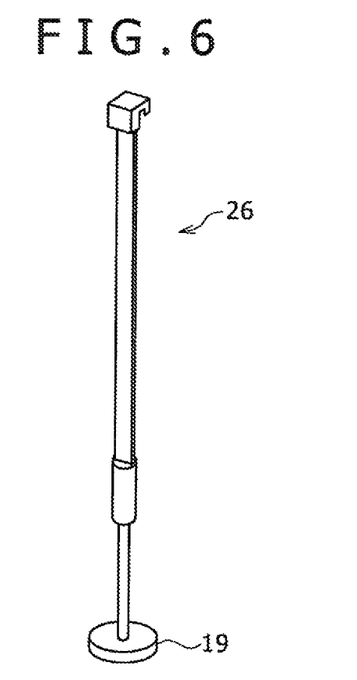
FIG. 6 is an enlarged view of a strip-shaped long body of the third embodiment.
Figure 7:
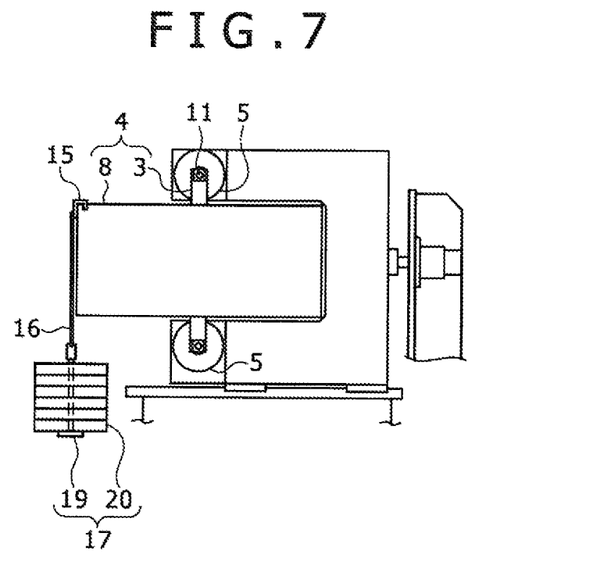
FIG. 7 is a diagram of a case where the strip-shaped long body of the third embodiment is used for downward calibration.

As illustrated in FIG. 6, the strip-shaped long body 26 is formed by a strip-shaped long plate member (such as a metal plate) as its name. The strip-shaped long member 26 is able to prevent the load applying member 17 from rotating, consequently to prevent the rotation of the weight member 20, and to stabilize the load in a shorter time. As illustrated in FIG. 7, the strip-shaped long body 26 can also be used in the downward calibration.

It should be understood that the embodiments disclosed herein are illustrative in all respects but not restrictive. In particular, in the embodiment disclosed herein, matters which are not explicitly disclosed, for example, the operating conditions and working conditions, various parameters, dimensions, weights, and volumes of the compositions and the like do not depart from the scope usually performed by those skilled in the art, and values that can be easily assumed by those skilled in the art are adopted.

What is claimed is:

1. A calibrating apparatus that performs calibration of force components along a lateral direction of a load cell on a tire testing machine having a cylindrical rotary drum that is rotatably mounted around a shaft portion oriented in a vertical direction, and the load cell that is mounted to the shaft portion of the rotary drum and capable of measuring force applied to the rotary drum, the calibrating apparatus comprising:

a hook member that is hooked on an outer peripheral edge of the rotary drum;

a linear body, one end side of which is connected to the hook member;

a load applying member that is connected to the other end side of the linear body and capable of generating a reference load for calibrating the load cell toward a downward direction; and a pulley device around which the linear body is wound to convert the downward force applied to the other end side of the linear body by the load applying member into an upward force on the hook member side of the linear body.

2. The calibrating apparatus of the tire testing machine according to claim 1,
 wherein the load applying member has a weight stacking unit mounted to a leading end of the linear body, and a plurality of weight members that can be stacked on the weight stacking unit.

3. The calibrating apparatus of the tire testing machine according to claim 2,
 wherein the weight members are formed in a disc-shaped object, and
 wherein a part of the weight members is recessed toward a center portion from an outer diameter portion, and the recessed portion is formed as an insertion hole.

4. The calibrating apparatus of the tire testing machine according to claim 3,
 wherein handles are mounted to the outer diameter portion of the weight member.

5. The calibrating apparatus of the tire testing machine according to claim 1,
 wherein a force measurer capable of measuring the upward force applied to the hook member is disposed on the linear body between the hook member and the pulley device.

6. The calibrating apparatus of the tire testing machine according to claim 1,
 wherein a strip-shaped long body formed by a strip-shaped long plate member is disposed between one end of the linear body extending from the hook member via the pulley device and the load applying member.

7. A calibrating method of the tire testing machine that performs calibration of force components along a lateral direction of the load cell, using the calibrating apparatus of the tire testing machine according to claim 2, the method comprising:
 a gradual increase process of adding one weight member stacked on the weight stacking unit and measuring the upward force applied to the hook member by the load cell each time; and
 a gradual decrease process of decreasing one weight member stacked on the weight stacking unit and measuring the upward force applied to the hook member by the load cell each time,
 wherein the load cell is calibrated based on a plurality of measured values of upward force obtained in the gradual increase process and the gradual decrease process.

* * * * *